United States Patent [19]

Arakawa et al.

[11] Patent Number: 4,896,043

[45] Date of Patent: Jan. 23, 1990

[54] RADIATION IMAGE STORAGE PANEL

[75] Inventors: Satoshi Arakawa, Minami-ashigara; Yuichi Hosoi, Chigasaki; Kenji Takahashi, Odaware, all of Japan

[73] Assignee: Fuji Photo Film Co., Ltd., Minami-ashigari, Japan

[21] Appl. No.: 195,379

[22] Filed: May 13, 1988

Related U.S. Application Data

[63] Continuation of Ser. No. 5,642, Jan. 21, 1987, abandoned.

[30] Foreign Application Priority Data

Jan. 21, 1986 [JP] Japan ................................ 61-11297
Dec. 27, 1986 [JP] Japan ................................ 61-309758

[51] Int. Cl.[4] ............................................ G03B 42/08
[52] U.S. Cl. ............................... 250/484.1; 250/327.2
[58] Field of Search ............... 250/327.2, 484.1, 487.1, 250/488.1; 350/1.6

[56] References Cited

U.S. PATENT DOCUMENTS

| | | | |
|---|---|---|---|
| 3,859,527 | 1/1975 | Luckey | 250/327.2 |
| 4,229,066 | 10/1980 | Rancourt et al. | 350/1.6 |
| 4,236,078 | 11/1980 | Kotera et al. | 250/363 R |
| 4,239,968 | 12/1980 | Kotera et al. | 250/327.2 |
| 4,350,893 | 9/1982 | Takahashi et al. | 250/484.1 |
| 4,368,390 | 1/1983 | Takahashi et al. | 250/363 R |
| 4,380,702 | 4/1983 | Takahashi et al. | 250/327.2 |
| 4,394,581 | 7/1983 | Takahashi et al. | 250/484.1 |
| 4,461,532 | 7/1984 | Sato et al. | 350/1.6 |
| 4,661,704 | 4/1987 | de Leeuw et al. | 250/327.2 |
| 4,701,663 | 10/1987 | Kawakatsu et al. | 313/112 |

*Primary Examiner*—Constantine Hannaher
*Attorney, Agent, or Firm*—Sixbey, Friedman, Leedom & Ferguson

[57] ABSTRACT

A radiation image storage panel comprising a phosphor layer which contains a stimulable phosphor, characterized in that one surface of said phosphor layer is provided with a multi-layer optical filter having a reflectance of not less than 60% at the stimulation wavelength of said stimulable phosphor.

15 Claims, 2 Drawing Sheets

RADIATION IMAGE STORAGE PANEL

This application is a continuation of Ser. No. 005,642, filed 1/21/87, now abandoned.

BACKGROUND OF THE INVENTION

1. Field of the Invention

The present invention relates to a radiation image storage panel employed in a radiation image recording and reproducing method utilizing a stimulable phosphor.

2. Description of the Prior Art

For obtaining a radiation image, there has been conventionally employed a radiography utilizing a combination of a radiographic film having an emulsion layer containing a photosensitive silver salt material and an intensifying screen. As a method replacing the conventional radiography, a radiation image recording and reproducing method utilizing a stimulable phosphor as described, for instance, in U.S. Pat. No. 4,239,968, has been recently paid much attention. In this method, a radiation image storage panel comprising a stimulable phosphor (i.e., stimulable phosphor sheet) is used, and the method involves steps of causing the stimulable phosphor of the panel to absorb radiation energy having passed through an object or having radiated from an object; sequentially exciting the stimulable phosphor with an electromagnetic wave such as visible light or infrared rays (hereinafter referred to as "stimulating rays") to release the radiation energy stored in the phosphor as light emission (stimulated emission); photoelectrically detecting the emitted light to obtain electric signals; and reproducing the radiation image of the object as a visible image from the electric signals.

In the radiation image recording and reproducing method, a radiation image is obtainable with a sufficient amount of information by applying a radiation to an object at considerably smaller dose, as compared with the conventional radiography. Accordingly, this method is of great value especially when the method is used for medical diagnosis.

The radiation image storage panel employed in the above-described method has a basic structure comprising a support and a phosphor layer provided on one surface of the support. Further, a transparent film of a polymer material is generally provided on the free surface (surface not facing the support) of the phosphor layer to keep the phosphor layer from chemical deterioration or physical shock.

The phosphor layer generally comprises a binder and stimulable phosphor particles dispersed therein. The stimulable phosphor emits light (gives stimulated emission) when excited with an electromagnetic wave (stimulating rays) such as visible light or infrared rays after having been exposed to a radiation such as X-rays. Accordingly, the radiation having passed through an object or radiated from an object is absorbed by the phosphor layer of the panel in proportion to the applied radiation dose, and a radiation image of the object is produced in the panel in the form of a radiation energy-stored image. The radiation energy-stored image can be released as stimulated emission by sequentially irradiating (scanning) the panel with stimulating rays. The stimulated emission is then photoelectrically detected to give electric signals, so as to reproduce a visible image from the electric signals.

The radiation image recording and reproducing method is very useful for obtaining a radiation image as a visible image as described hereinbefore, and it is desired for the radiation image storage panel employed in the method to have a high sensitivity and provide an image of high quality (high sharpness, high graininess, etc.), as well as the radiographic intensifying screen employed in the conventional radiography. Especially when the object is a human body, the sensitivity of the panel is desired to be increased, even if the level is low, for the purpose of reducing the radiation dose applied to the human body.

The sensitivity of the radiation image storage panel is basically determined by the amount of stimulated emission given by the stimulable phosphor contained in the panel, and the amount thereof varies depending upon not only the emission characteristics of the phosphor per se but also an intensity of stimulating rays for causing the phosphor to give stimulated emission when the intensity thereof is not sufficient.

In the radiation image recording and reproducing method, the radiation image storage panel is generally read out by scanning the surface of the panel with stimulating rays such as a laser beam. A portion of the stimulating rays passes through the panel and is released from the other surface (opposite surface) of the panel without exciting the stimulable phosphor, so that the phosphor is not sufficiently excited with the stimulating rays. Accordingly, the stimulating rays are not always employed efficiently in the method. Especially in the case of using a laser having a small power as a source of stimulating rays, it is desired to efficiently employ stimulating rays so as to enhance the sensitivity of the panel.

There has been filed a patent application for a radiation image storage panel on the surface of which an anti-reflecting film comprising an inorganic material or the like is provided (Japanese Patent Provisional Publication No. 61(1986)-164200, whose content is described in U.S. patent application No. 818,239, now U.S. Pat. No. 4,645,721, and in European Patent Application No. 86100417.4). The provision of the anti-reflecting film is intended to prevent the irradiated stimulating rays from being reflected by the panel surface and the anti-reflecting film is a thin film merely having a low reflectance for the stimulating rays.

SUMMARY OF THE INVENTION

It is an object of the present invention to provide a radiation image storage panel improved in the sensitivity.

The object can be accomplished by a radiation image storage panel comprising a phosphor layer which contains a stimulable phosphor, characterized in that one surface of said phosphor layer is provided with a multi-layer optical filter having a reflectance of not less than 60% at the stimulation wavelength of said stimulable phosphor.

In the present invention, one surface of the phosphor layer of the radiation image storage panel is provided with a multi-layer optical filter (optical filter composed of a multi-layer film) having the reflection characteristics with respect to the light of the stimulation wavelength of a stimulable phosphor contained in the panel, whereby the utilization efficiency of stimulating rays is increased and the sensitivity of the panel is remarkably improved.

More in detail, a multi-layer optical filter such as a dichroic filter having the reflection characteristics for the stimulating rays is provided on one surface of the phosphor layer, and the surface of the panel on the side where the optical filter is not provided is irradiated with the stimulating rays in the read-out procedure. The stimulating rays passing through the phosphor layer without exciting the stimulable phosphor is reflected on the multi-layer optical filter and again travel into the phosphor layer. When the multi-layer optical filter is transmissive for the light emitted by the stimulable phosphor, the emitted light passes through the optical filter and is detected by a photodetector placed on the other side of the panel, namely the detection of light is made on the filter side of the panel.

As a result, such loss of the stimulating rays that the rays do not contribute to the excitation of the stimulable phosphor in the phosphor layer and escape from the panel can be reduced. The proportion of reading out information stored in the excited stimulable phosphor (i.e., trapped electrons) can be increased. In other words, the amount of stimulated emission given by the phosphor is highly increased by confining the stimulating rays in the panel and hence, the sensitivity of the panel can be prominently enhanced as compared with the conventional one.

Even when the radiation image storage panel is irradiated with low-intensity stimulating rays, the amount of stimulated emission given by the phosphor in the panel can be kept largely and hence, the sensitivity of the panel can be highly improved. Especially when a source of stimulating rays has a small power, or the intensity of stimulating rays are unable to be increased because of read-out conditions, etc., it is very advantageous to increase the utilization efficiency of the stimulating rays for the panel.

Further, only the emitted light passes through the multi-layer optical filter and is detected, the stimulating rays not passing therethrough, when the filter is transmissive for the emitted light. The separation of wavelength is not necessary in the detection of light and setting of the means therefor is not required, even when the wavelength of the emitted light is close to that of the stimulating rays.

Therefore, employment of the radiation image storage panel of the present invention can relax restrictions on the source of stimulating rays or read-out system, so that a radiation image recording and reproducing device used in reading out the panel can be readily improved, for instance, in making its size smaller and in the high-speed reading. The radiation image recording and reproducing method using the panel of the invention can be applied in a wide range.

In addition, when the phosphor layer consists essentially of a stimulable phosphor by preparing it using a deposition method, a sintering method or the like, the phosphor layer contains the stimulable phosphor at a high density, so that the amount of a radiation absorbable therein is larger than a phosphor layer which comprises a binder and a stimulable phosphor. Hence, the sensitivity of the panel is more enhanced. The contamination of air which is apt to occur during dispersing the phosphor in the binder is also prevented, so that the scattering of stimulating rays and emitted light is reduced and the sensitivity of the panel is further enhanced. Further, quantum noises of radiation can be reduced owing to the increase of the amount of absorption thereof per the area of the phosphor layer and to the efficient reading out of information, and an image of good graininess can be obtained.

DETAILED DESCRIPTION OF THE INVENTION

Figure 1:
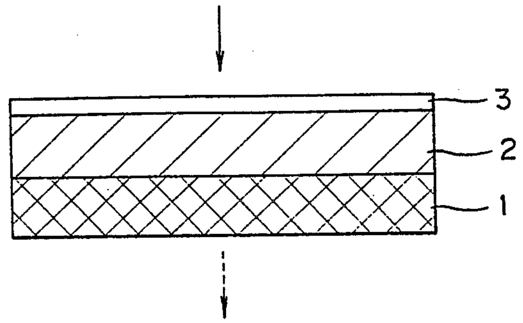
FIG. 1 is a cross-sectional view showing an embodiment of the radiation image storage panel according to the present invention.

An embodiment of the radiation image storage panel of the present invention having the above-mentioned favorable characteristics is shown in FIG. 1.

FIG. 1 is a sectional view illustrating a structure of the radiation image storage panel according to the invention. In FIG. 1, the panel comprises a multi-layer optical filter 1, a phosphor layer 2 and a protective film 3, superposed in this order. The multi-layer optical filter 1 is reflective for the light of the stimulation wavelength of the stimulable phosphor and transmissive for the light of the emission (stimulated emission) wavelength thereof. The irradiation of stimulating rays is carried out on the protective film-side (in FIG. 1, indicated by an arrow drawn by solid line →) and the detection of emitted light is carried out on the filter side (in FIG. 1, indicated by an arrow drawn by dotted line - - ->).

The radiation image storage panel of the invention is by no means restricted to the embodiment shown in FIG. 1, and any structure can be applied to the panel of the invention as far as the multi-layer optical filter is provided on one surface of the phosphor layer. For instance, a support may be further provided on the other surface of the multi-layer optical filter.

The radiation image storage panel of the present invention can be prepared, for instance, by a process described below.

The multi-layer optical filter employable in the invention has a reflectance of not less than 60% with respect to stimulating rays for exciting a stimulable phosphor contained in the radiation image storage panel, and preferably not less than 80%. That is, the optical filter is required to have said reflectance for at least one wavelength within the region of the stimulation wavelength for the stimulable phosphor, preferably at the wavelength in the vicinity of peak of the stimulation spectrum of the phosphor.

The multi-layer optical filter preferably has a transmittance of not less than 60% with respect to the light (stimulated emission) emitted by the stimulable phosphor and more preferably not less than 80%. The optical filter has such transmittance for at least one wavelength within the wavelength region of the stimulated emission of the stimulable phosphor, preferably at the wavelength in the vicinity of peak of the emission spectrum of the phosphor.

For instance, a commercially available radiation image storage panel generally employs a divalent europium activated barium fluorohalide phosphor (peak wavelength of the stimulated emission: approx. 390 nm), and a He-Ne laser beam (wavelength: 633 nm) is employed as stimulating rays for exciting the phosphor. Accordingly, when the phosphor layer of the invention contains said stimulable phosphor, the multi-layer optical filter has only to have said reflectance at the stimulation wavelength of 633 nm. The filter preferably has said transmittance at the emission wavelength of approx. 390 nm.

A representative multi-layer optical filter having said reflection characteristics and further the transmission characteristics is a dichroic filter.

Figure 2:
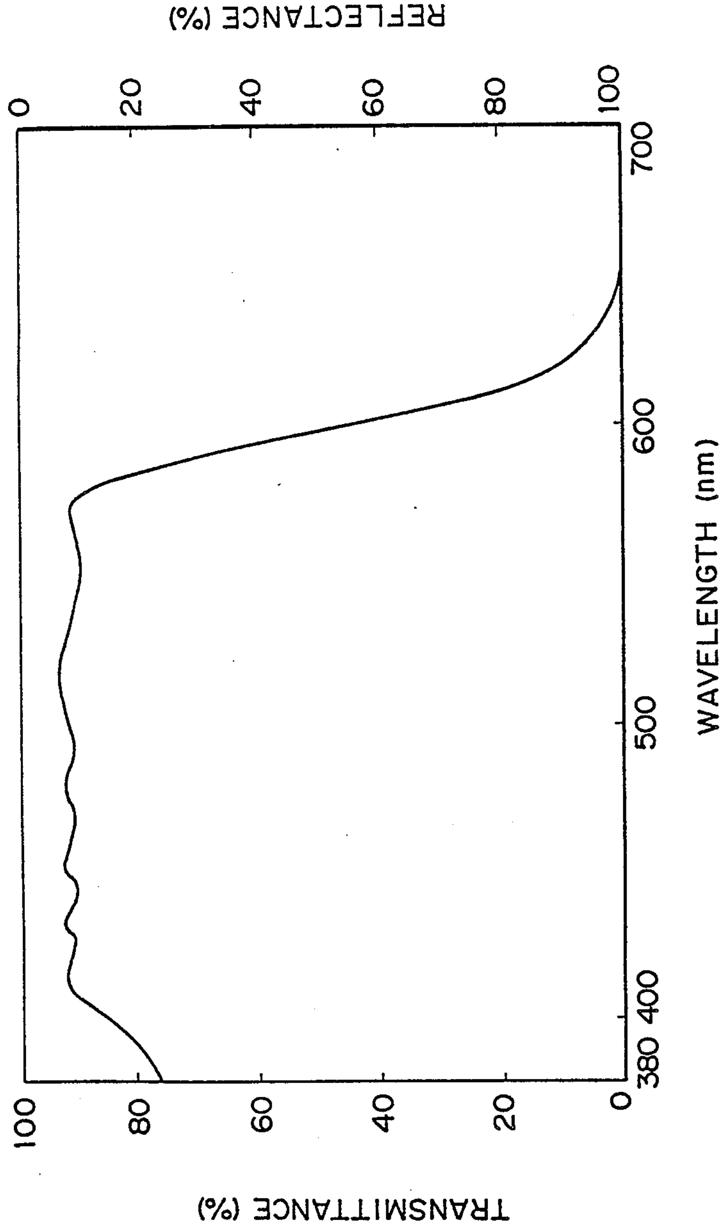
FIG. 2 is a graph showing a transmission (reflection) spectrum of a dichroic filter which is an example of the multi-layer optical filter employed in the radiation image storage panel of the invention.

The transmission and reflection characteristics of the dichroic filter, which is an example of the multi-layer optical filter employable in the invention, are shown in FIG. 2.

FIG. 2 shows a transmission and reflection spectrum of the dichroic filter, which is reflective at the stimulation wavelength of the stimulable phosphor and transmissive at the stimulation wavelength thereof.

The multi-layer optical filter is prepared by successively laminating two or more materials having different refractive index in the thickness of approx. ¼ of the wavelength of light. Materials for the multi-layer optical filter can be selected from those conventionally employed for the known optical thin films. Examples of the materials include materials having a low refractive index such as $SiO_2$ and $MgF_2$ and materials having a high refractive index such as $TiO_2$, $ZrO_2$ and ZnS.

The multi-layer optical filter can be prepared, for example, by laminating thin films of the above-mentioned materials in the form of several to several tens layers on a transparent substrate such as a glass plate through vacuum deposition, spattering, ion-plating, etc. Especially, the ion-plating method is preferred, since a optical filter having a high adhesion with the substrate can be prepared without rising the temperature of the substrate even when the substrate is made of a polymer material.

In the preparation of the multi-layer optical filter, the employed materials (refractive index) and the thickness of each layer are controlled to obtain various optical filters having the aforementioned characteristics suitable for the stimulable phosphor to be employed. The whole thickness of the multi-layer optical filter is in the range of approx. 0.1 to 10 μm.

Since the multi-layer optical filter is generally formed on the substrate such as a glass plate, it is unnecessary to provide a support in the radiation image storage panel of the invention. If desired, a transparent support such as a plastic sheet may be provided on other surface (surface not facing the phosphor layer) of the optical filter using an adhesive agent, etc.

On the transparent substrate having the multi-layer optical filter is provided a phosphor layer. The phosphor layer contains a stimulable phosphor, that is, the phosphor layer may comprise a binder and a stimulable phosphor dispersed therein, or may consist essentially of a stimulable phosphor. In the latter case, trace amount of a binder, etc. can be contained in the phosphor layer.

The stimulable phosphor, as described hereinbefore, gives stimulated emission when excited with stimulating rays after exposure to a radiation. From the viewpoint of practical use, the stimulable phosphor is desired to give stimulated emission in the wavelength region of 300–500 nm when excited with stimulating rays in the wavelength region of 400–900 nm.

Examples of the stimulable phosphor employable in the radiation image storage panel of the present invention include:

SrS:Ce,Sm, SrS:Eu,Sm, $ThO_2$:Er, and $La_2O_2S$:Eu,Sm, as described in U.S. Pat. No. 3,859,527;

ZnS:Cu,Pb, $BaO.xAl_2O_3$:Eu, in which x is a number satisfying the condition of $0.8 \leq x \leq 10$, and $M^{2+}O.xSiO_2$:A, in which $M^{2+}$ is at least one divalent metal selected from the group consisting of Mg, Ca, Sr, Zn, Cd and Ba, A is at least one element selected from the group consisting of Ce, Tb, Eu, Tm, Pb, Tl, Bi and Mn, and x is a number satisfying the condition of $0.5 \leq x \leq 2.5$, as described in U.S. Pat. No. 4,236,078;

$(Ba_{1-x-y},Mg_x,Ca_y)FX:aEu^{2+}$, in which X is at least one element selected from the group consisting of Cl and Br, x and y are numbers satisfying the conditions of $0 < x+y \leq 0.6$ and $xy \neq 0$, and a is a number satisfying the condition of $10^{-6} \leq a \leq 5 \times 10^{-2}$, as described in Japanese Patent Provisional Publication No. 55(1980)-12143;

LnOX:xA, in which Ln is at least one element selected from the group consisting of La, Y, Gd and Lu, X is at least one element selected from the group consisting of Cl and Br, A is at least one element selected from the group consisting of Ce and Tb, and x is a number satisfying the condition of $0 < x < 0.1$, as described in U.S. Pat. No. 4,236,078;

$(Ba_{1-x},M^{2+}_x)FX:yA$, in which $M^{2+}$ is at least one divalent metal selected from the group consisting of Mg, Ca, Sr, Zn and Cd, X is at least one element selected from the group consisting of Cl, Br and I, A is at least one element selected from the group consisting of Eu, Tb, Ce, Tm, Dy, Pr, Ho, Nd, Yb and Er, and x and y are numbers satisfying the conditions of $0 \leq x \leq 0.6$ and $0 \leq y \leq 0.2$, respectively, as described in U.S. Pat. No. 4,239,968;

$M^{II}FX.xA:yLn$, in which $M^{II}$ is at least one element selected from the group consisting of Ba, Ca, Sr, Mg, Zn and Cd; A is at least one compound selected from the group consisting of BeO, MgO, CaO, SrO, BaO, ZnO, $Al_2O_3$, $Y_2O_3$, $La_2O_3$, $In_2O_3$, $SiO_2$, $TiO_2$, $ZrO_2$, $GeO_2$, $SnO_2$, $Nb_2O_5$, $Ta_2O_5$ and $ThO_2$; Ln is at least one element selected from the group consisting of Eu, Tb, Ce, Tm, Dy, Pr, Ho, Nd, Yb, Er, Sm and Gd; X is at least one element selected from the group consisting of Cl, Br and I; and x and y are numbers satisfying the conditions of $5 \times 10^{-5} \leq x \leq 0.5$ and $0 < y \leq 0.2$, respectively, as described in Japanese Patent Provisional Publication No. 55(1980)-160078;

$(Ba_{1-x},M^{II}_x)F_2.aBaX_2:yEu,zA$, in which $M^{II}$ is at least one element selected from the group consisting of Be, Mg, Ca, Sr, Zn and Cd; X is at least one element selected from the group consisting of Cl, Br and I; A is at least one element selected from the group consisting of Zr and Sc; and a, x, y and z are numbers satisfying the conditions of $0.5 \leq a \leq 1.25$, $0 \leq x \leq 1$, $10^{-6} \leq y \leq 2 \times 10^{-1}$, and $0 < z \leq 10^{-2}$, respectively, as described in Japanese Patent Provisional Publication No. 56(1981)-116777;

$(Ba_{1-x},M^{II}_x)F_2.aBaX_2:yEu,zB$, in which $M^{II}$ is at least one element selected from the group consisting of Be, Mg, Ca, Sr, Zn and Cd; X is at least one element selected from the group consisting of Cl, Br and I; and a, x, y and z are numbers satisfying the conditions of $0.5 \leq a \leq 1.25$, $0 \leq x \leq 1$, $10^{-6} \leq y \leq 2 \times 10^{-1}$, and $0 < z \leq 2 \times 10^{-1}$, respectively, as described in Japanese Patent Provisional Publication No. 57(1982)-23673;

$(Ba_{1-x},M^{II}_x)F_2.aBaX_2:yEu,zA$, in which $M^{II}$ is at least one element selected from the group consisting of Be, Mg, Ca, Sr, Zn and Cd; X is at least one element selected from the group consisting of Cl, Br and I; A is at least one element selected from the group consisting of As and Si; and a, x, y and z are numbers satisfying the conditions of $0.5 \leq a \leq 1.25$, $0 \leq x \leq 1$, $10^{-6} \leq y \leq 2 \times 10^{-1}$, and $0 < z \leq 5 \times 10^{-1}$, respectively, as described in Japanese Patent Provisional Publication No. 57(1982)-23675;

$M^{III}OX{:}xCe$, in which $M^{III}$ is at least one trivalent metal selected from the group consisting of Pr, Nd, Pm, Sm, Eu, Tb, Dy, Ho, Er, Tm, Yb, and Bi; X is at least one element selected from the group consisting of Cl and Br; and x is a number satisfying the condition of $0 < x < 0.1$, as described in Japanese Patent Provisional Publication No. 58(1983)-69281;

$Ba_{1-x}M_{x/2}L_{x/2}FX{:}yEu^{2+}$, in which M is at least one alkali metal selected from the group consisting of Li, Na, K, Rb and Cs; L is at least one trivalent metal selected from the group consisting of Sc, Y, La, Ce, Pr, Nd, Pm, Sm, Gd, Tb, Dy, Ho, Er, Tm, Yb, Lu, Al, Ga, In and Tl; X is at least one halogen selected from the group consisting of Cl, Br and I; and x and y are numbers satisfying the conditions of $10^{-2} \leq x \leq 0.5$ and $0 < y \leq 0.1$, respectively, as described in U.S. Patent Application No. 497,805;

$BaFX.xA{:}yEu^{2+}$, in which X is at least one halogen selected from the group consisting of Cl, Br and I; A is at least one fired product of a tetrafluoroboric acid compound; and x and y are numbers satisfying the conditions of $10^{-6} \leq x \leq 0.1$ and $0 < y \leq 0.1$, respectively, as described in U.S. patent application No. 520,215;

$BaFX.xA{:}yEu^{2+}$, in which X is at least one halogen selected from the group consisting of Cl, Br and I; A is at least one fired product of a hexafluoro compound selected from the group consisting of monovalent and divalent metal salts of hexafluoro silicic acid, hexafluoro titanic acid and hexafluoro zirconic acid; and x and y are numbers satisfying the conditions of $10^{-6} \leq x \leq 0.1$ and $0 < y \leq 0.1$, respectively, as described in U.S. patent application No. 502,648;

$BaFX.xNaX'{:}aEu^{2+}$, in which each of X and X' is at least one halogen selected from the group consisting of Cl, Br and I; and x and a are numbers satisfying the conditions of $0 < x \leq 2$ and $0 < a \leq 0.2$, respectively, as described in Japanese Patent Provisional Publication No. 59(1984)-56479;

$M^{II}FX.xNaX'{:}yEu^{2+}{:}zA$, in which $M^{II}$ is at least one alkaline earth metal selected from the group consisting of Ba, Sr and Ca; each of X and X' is at least one halogen selected from the group consisting of Cl, Br and I; A is at least one transition metal selected from the group consisting of V, Cr, Mn, Fe, Co and Ni; and x, y and z are numbers satisfying the conditions of $0 < x \leq 2$, $0 < y \leq 0.2$ and $0 < z \leq 10^{-2}$, respectively, as described in U.S. patent application No. 535,928, now U.S. Pat. No. 4,505,989;

$M^{II}FX.aM^{I}X'.bM'^{II}X''_2.cM^{III}X'''_3.xA{:}yEu^{2+}$, in which $M^{II}$ is at least one alkaline earth metal selected from the group consisting of Ba, Sr and Ca; $M^{I}$ is at least one alkali metal selected from the group consisting of Li, Na, K, Rb and Cs; $M'^{II}$ is at least one divalent metal selected from the group consisting of Be and Mg; $M^{III}$ is at least one trivalent metal selected from the group consisting of Al, Ga, In and Tl; A is metal oxide; X is at least one halogen selected from the group consisting of Cl, Br and I; each of X', X'' and X''' is at least one halogen selected from the group consisting of F, Cl, Br and I; a, b and c are numbers satisfying the conditions of $0 \leq a \leq 2$, $0 \leq b \leq 10^{-2}$, $0 \leq c \leq 10^{-2}$ and $a+b+c \geq 10^{-6}$; and x and y are numbers satisfying the conditions of $0 < x \leq 0.5$ and $0 < y \leq 0.2$, respectively, as described in U.S. patent application No. 543,326;

$M^{II}X_2.aM^{II}X'_2{:}xEu^{2+}$, in which $M^{II}$ is at least one alkaline earth metal selected from the group consisting of Ba, Sr and Ca; each of X and X' is at least one halogen selected from the group consisting of Cl, Br and I, and $X \neq X'$; and a and x are numbers satisfying the conditions of $0.1 \leq a \leq 10.0$ and $0 < x \leq 0.2$, respectively, as described in U.S. patent application No. 660,987;

$M^{II}FX.aM^{I}X'{:}xEu^{2+}$, in which $M^{II}$ is at least one alkaline earth metal selected from the group consisting of Ba, Sr and Ca; $M^{I}$ is at least one alkali metal selected from the group consisting of Rb and Cs; X is at least one halogen selected from the group consisting of Cl, Br and I; X' is at least one halogen selected from the group consisting of F, Cl, Br and I; and a and x are numbers satisfying the conditions of $0 \leq a \leq 4.0$ and $0 < x \leq 0.2$, respectively, as described in U.S. patent application No. 668,464; and $M^{I}X{:}xBi$, in which $M^{I}$ is at least one alkali metal selected from the group consisting of Rb and Cs; X is at least one halogen selected from the group consisting of Cl, Br and I; and x is a number satisfying the condition of $0 < x \leq 0.2$, as described in U.S. patent application No. 846,919.

The $M^{II}X_2.aM^{II}X'_2{:}xEu^{2+}$ phosphor described in the above-mentioned U.S. patent application No. 660,987 may contain the following additives in the following amount per 1 mol of $M^{II}X_2.aM^{II}X'_2$:

$bM^{I}X''$, in which $M^{I}$ is at least one alkali metal selected from the group consisting of Rb and Cs; X'' is at least one halogen selected from the group consisting of F, Cl, Br and I; and b is a number satisfying the condition of $0 < b \leq 10.0$, as described in U.S. patent application No. 699,325;

$bKX''.cMgX'''_2.dM^{III}X''''_3$, in which $M^{III}$ is at least one trivalent metal selected from the group consisting of Sc, Y, La, Gd and Lu; each of X'', X''' and X'''' is at least one halogen selected from the group consisting of F, Cl, Br and I; and b, c and d are numbers satisfying the conditions of $0 \leq b \leq 2.0$, $0 \leq c \leq 2.0$, $0 \leq d \leq 2.0$ and $2 \times 10^{-5} \leq b+c+d$, as described in U.S. patent application No. 723,819;

yB, in which y is a number satisfying the condition of $2 \times 10^{-4} \leq y \leq 2 \times 10^{-1}$, as described in U.S. patent application No. 727,974;

bA, in which A is at least one oxide selected from the group consisting of $SiO_2$ and $P_2O_5$; and b is a number satisfying the condition of $10^{-4} \leq b \leq 2 \times 10^{-1}$, as described in U.S. patent application No. 727,972;

bSiO, in which b is a number satisfying the condition of $0 < b \leq 3 \times 10^{-2}$, as described in U.S. patent application No. 797,971;

$bSnX''_2$, in which X'' is at least one halogen selected from the group consisting of F, Cl, Br and I; and b is a number satisfying the condition of $0 < b \leq 10^{-3}$, as described in U.S. patent application No. 797,971;

$bCsX''.cSnX'''_2$, in which each of X'' and X''' is at least one halogen selected from the group consisting of F, Cl, Br and I; and b and c are numbers satisfying the conditions of $0 < b \leq 10.0$ and $10^{-6} \leq c \leq 2 \times 10^{-2}$, respectively, as described in U.S. patent application No. 850,715; and $bCsX''.yLn^{3+}$, in which X'' is at least one halogen selected from the group consisting of F, Cl, Br and I; Ln is at least one rare earth element selected from the group consisting of Sc, Y, Ce, Pr, Nd, Sm, Gd, Tb, Dy, Ho, Er, Tm, Yb and Lu; and b and y are numbers satisfying the conditions of $0 < b \leq 10.0$ and $10^{-6} \leq y \leq 1.8 \times 10^{-1}$, respectively, as described in U.S. patent application No. 850,715.

Among the above-described stimulable phosphors, the divalent europium activated alkaline earth metal halide phosphor and rare earth element activated rare earth oxyhalide phosphor are particularly preferred, because these phosphors show stimulated emission of high luminance. The above-described stimulable phosphors are given by no means to restrict the stimulable phosphor employable in the present invention. Any other phosphors can be also employed, provided that the phosphor gives stimulated emission when excited with stimulating rays after exposure to a radiation.

In the case of the phosphor layer comprising a stimulable phosphor and a binder, the phosphor layer can be formed on the muli-layer filter, for instance, by the following procedure.

In the first place, the above-described stimulable phosphor particles and a binder are added to an appropriate solvent, and then they are mixed to prepare a coating dispersion comprising the phosphor particles homogeneously dispersed in the binder solution.

Examples of the binder to be contained in the phosphor layer include: natural polymers such as proteins (e.g. gelatin), polysaccharides (e.g. dextran) and gum arabic; and synthetic polymers such as polyvinyl butyral, polyvinyl acetate, nitrocellulose, ethylcellulose, vinylidene chloride-vinyl chloride copolymer, polyalkyl (meth)acrylate, vinyl chloride-vinyl acetate copolymer, polyurethane, cellulose acetate butyrate, polyvinyl alcohol, and linear polyester. Particularly preferred are nitrocellulose, linear polyester, polyalkyl (meth)acrylate, a mixture of nitrocellulose and linear polyester, and a mixture of nitrocellulose and polyalkyl (meth)acrylate. These binders may be crosslinked with a crosslinking agent.

Examples of the solvent employable in the preparation of the coating dispersion include lower alcohols such as methanol, ethanol, n-propanol and n-butanol; chlorinated hydrocarbons such as methylene chloride and ethylene chloride; ketones such as acetone, methyl ethyl ketone and methyl isobutyl ketone; esters of lower alcohols with lower aliphatic acids such as methyl acetate, ethyl acetate and butyl acetate; ethers such as dioxane, ethylene glycol monoethylether and ethylene glycol monomethyl ether; and mixtures of the above-mentioned compounds.

The ratio between the binder and the stimulable phosphor in the coating dispersion may be determined according to the characteristics of the aimed radiation image storage panel and the nature of the phosphor employed. Generally, the ratio therebetween is within the range of from 1:1 to 1:100 (binder:phosphor, by weight), preferably from 1:8 to 1:40.

The coating dispersion may contain a dispersing agent to improve the dispersibility of the phosphor particles therein, and may contain a variety of additives such as a plasticizer for increasing the bonding between the binder and the phosphor particles in the phosphor layer. Examples of the dispersing agent include phthalic acid, stearic acid, caproic acid and a hydrophobic surface active agent. Examples of the plasticizer include phosphates such as triphenyl phosphate, tricresyl phosphate and diphenyl phosphate; phthalates such as diethyl phthalate and dimethoxyethyl phthalate; glycolates such as ethylphthalyl ethyl glycolate and butylphthalyl butyl glycolate; and polyesters of polyethylene glycols with aliphatic dicarboxylic acids such as polyester of triethylene glycol with adipic acid and polyester of diethylene glycol with succinic acid.

The coating dispersion containing the phosphor particles and the binder prepared as described above is applied evenly onto the surface of the multi-layer optical filter to form a layer of the coating dispersion. The coating procedure can be carried out by a conventional method such as a method using a doctor blade, a roll coater or a knife coater.

After applying the coating dispersion onto the multilayer optical filter, the coating dispersion is then heated slowly to dryness so as to complete the formation of a phosphor layer. The thickness of the phosphor layer varies depending upon the characteristics of the aimed radiation image storage panel, the nature of the phosphor, the ratio between the binder and the phosphor, etc. Generally, the thickness of the phosphor layer is within the range of from 20 μm to 1 mm, preferably from 50 to 500 μm.

The phosphor layer can be provided onto the multilayer optical filter by the methods other than that given in the above. For instance, the phosphor layer is initially prepared on a sheet such as a glass plate, metal plate or plastic sheet using the aforementioned coating dispersion and then thus prepared phosphor layer is superposed on the multi-layer optical filter by pressing or using an adhesive agent.

In the case of the phosphor layer consisting essentially of a stimulable phosphor, the phosphor layer can be formed on the support, for instance, by a deposition method such as vacuum deposition or by a sintering method.

Figure 3:
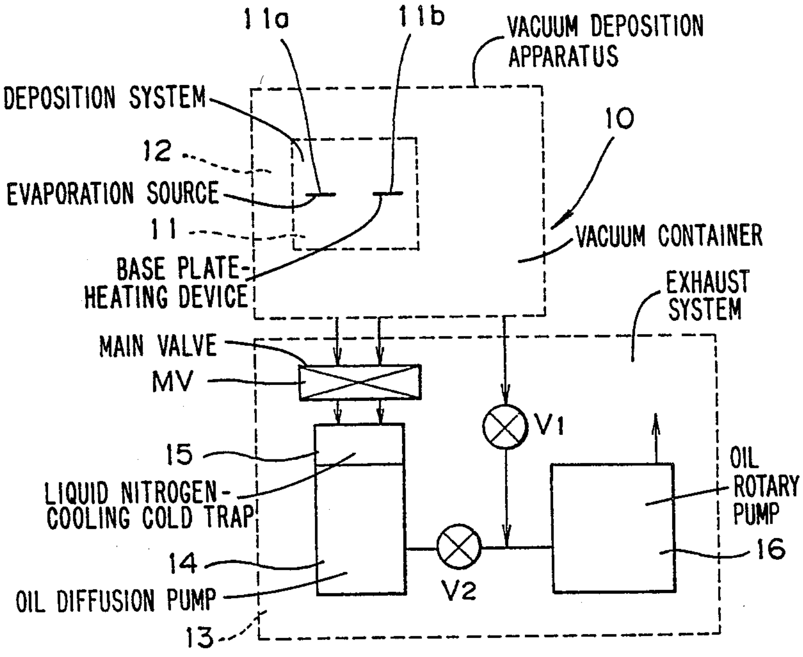
FIG. 3 is a schematic view showing a vacuum deposition apparatus employed in the preparation of the radiation image storage panel of the invention.

The vacuum deposition is carried out by using a vacuum deposition apparatus as shown in FIG. 3.

FIG. 3 is a schematic view illustrating a representative example of vacuum deposition apparatus.

In FIG. 3, the vacuum deposition apparatus 10 comprises a vacuum container 12 in which a deposition system 11 for performing vacuum deposition is enclosed to constitute a body, and an exhaust system 13 for making the container 12 vacuum. The exhaust system 13 comprises an oil diffusion pump 14, a liquid nitrogen-cooling cold trap 15 and an oil rotary pump 16. The exhaust system 13 is connected to the body by means of a main valve (MV) and other valves ($V_1$ and $V_2$). The deposition system 11 includes an evaporation source **11*a* and a base plate-heating device 11*b***.

The stimulable phosphor particles are introduced into a molybdenum boat being the evaporation source **11*a*, equipped in the deposition system 11. The substrate that is a material to be deposited is also fixed in the defined place of the deposition system 11. The exhaust system 13 is driven to perform deposition of the phosphor particles onto the substrate by setting a vapor pressure within the vacuum container 12** to the fixed pressure (not higher than $10^{-6}$ Torr).

The deposition is carried out by a process comprising the steps of initially heating the substrate at the defined temperature (e.g., approx. 25°-400° C.), driving the exhaust system 13, and then heating the molybdenum boat. The deposition rate of the phosphor particles is generally in the range of approx. 200-4,400 angstrom/-min. Thus, a film composed of deposited stimulable phosphor is formed on the substrate.

The substrate is generally subjected to a cleaning treatment prior to performing the deposition. Conventional creaning methods can be employed and examples thereof include an ultrasonic cleaning method, a vapor cleaning method and a combination thereof. In these methods, cleaning agents, chemicals, solvents, etc. are appropriately employed.

The formation of the phosphor layer by vacuum deposition can be carried out concretely by utilizing a method described in P. F. Carcia and L. H. Brixner, Electronics and Optics, Thin Solid Film, 115(1984) 89–95.

The thickness of the phosphor layer (layer of deposited phosphor) varies depending upon the characteristics of the aimed radiation image storage panel and the nature of the phosphor. Generally, the thickness of the phosphor layer is within the range of from 10 to 500 μm, and preferably from 20 to 250 μm.

The surface of the phosphor layer prepared by the deposition method has high smoothness, and hence it is prominently advantageous to provide thereon a multi-layer optical filter. The multi-layer optical filter may be formed on the phosphor layer after forming the phosphor layer by said method. Otherwise, the multi-layer optical filter and the phosphor layer can be also formed continuously in the same vacuum system by the deposition method and hence, the process for the preparation of the panel can be simplified.

On the surface of the phosphor layer not facing the multi-layer optical filter, a transparent protective film may be provided to protect the phosphor layer from physical and chemical deterioration.

The protective film can be provided on the phosphor layer by coating the surface of the phosphor layer with a solution of a transparent polymer such as a cellulose derivative (e.g. cellulose acetate or nitrocellulose), or a synthetic polymer (e.g. polymethyl methacrylate, polyvinyl butyral, polyvinyl formal, polycarbonate, polyvinyl acetate, or vinyl chloride-vinyl acetate copolymer), and drying the coated solution. Alternatively, the transparent film can be provided on the phosphor layer by beforehand preparing it from a polymer such as polyethylene terephthalate, polyethylene, polyvinylidene chloride or polyamide, followed by placing and fixing it onto the phosphor layer with an appropriate adhesive agent. The transparent protective film preferably has a thickness within the range of approximately 0.1 to 20 μm.

Otherwise, the protective film may be provided on the multi-layer optical filter by deposition inorganic materials such as oxides (e.g. $SiO_2$, $Al_2O_3$), fluorides (e.g. $MgF_2$) and carbides (e.g. SiC) on the surface of the phosphor. By using glasses, ceramics or coating agents the protective film can be also provided thereon.

The radiation image storage panel of the invention may be colored with a colorant to enhance the sharpness of the resulting image, as described in U.S. Pat. No. 4,394,581 and U.S. patent application No. 326,642, now U.S. Pat. No. 4,491,736. For the same purpose, the radiation image storage panel of the invention may contain a white powder in the phosphor layer, as described in U.S. Pat. No. 4,350,893.

The following examples further illustrate the present invention, but these examples are understood to by no means restrict the invention.

EXAMPLE 1

To a mixture of a divalent europium activated barium fluorobromide stimulable phosphor ($BaFBr:0.001Eu^{2+}$) and a linear polyester resin were added successively methyl ethyl ketone and nitrocellulose (nitration degree: 11.5%), to prepare a dispersion. Subsequently, tricresyl phosphate, n-butanol and methyl ethyl ketone were added to the dispersion. The mixture was sufficiently stirred by means of a propeller agitater to obtain a homogeneous coating dispersion containing the binder and the phosphor in the ratio of 1:10 (binder:-phosphor, by weight) and having a viscosity of 25–35 PS (at 25° C.).

The coating dispersion was evenly applied to a dichroic filter (a multi-layer film provided on a transparent glass plate, trade name: DF-C, available from Hoya Glass Co., Ltd.) placed horizontally, which had such transmission and reflection characteristics as shown in FIG. 2. The application of the coating dispersion was carried out using a doctor blade. The glass plate having a layer of the coating dispersion was then placed in an oven and heated at a temperature gradually rising from 25° to 100° C. Thus, a phosphor layer having thickness of 250 μm was formed on the dichroic filter.

On the phosphor layer was placed a transparent polyethylene terephthalate film (thickness: 12 μm; provided with a polyester adhesive layer on one surface) to combine the transparent film and the phosphor layer with the adhesive layer.

Thus, a radiation image storage panel consisting essentially of a dichroic filter, a phosphor layer and a transparent protective film was prepared (see: FIG. 1).

Comparison Example 1

The procedure of Example 1 was repeated except for using a transparent glass plate having the same thickness as that of the dichroic filter used in Example 1 instead of the dichroic filter, to prepare a radiation image storage panel consisting essentially of a support (glass plate), a phosphor layer and a transparent protective film.

The radiation image storage panels prepared as above were evaluated on the sensitivity according to the following test.

The protective film-side of the radiation image storage panel was exposed to X-rays at a voltage of 80 KVp and excited with a He-Ne laser beam (wavelength: 633 nm), and subsequently the light emitted by the panel was detected from the dichroic filter-side opposite thereto, to measure the sensitivity.

The results are set forth in Table 1.

TABLE 1

| | Relative Sensitivity |
|---|---|
| Example 1 | 150 |
| Com. Example 1 | 100 |

As is evident from the results set forth in Table 1, the radiation image storage panel having a multi-layer optical filter according to the invention (Example 1) was remarkably enhanced in the sensitivity, as compared with the conventional radiation image storage panel having no multi-layer optical filter (Comparison Example 1).

EXAMPLE 2

A powdery divalent europium activated barium fluorobromide phosphor ($BaFBr:0.001Eu^{2+}$) was deposited on the same dichroic filter as used in Example 1, to form a phosphor layer of deposited phosphor. The deposition of the phosphor was carried out as follows: The phosphor particles were introduced into a molybdenum boat in a vacuum container (vapor pressure: approx. $2\times10^{-7}$ Torr) of a vacuum deposition apparatus and then heated. The glass plate provided with the dichroic filter (material on which the phosphor was to be deposited) was beforehand subjected to an ultrasonic cleaning treatment on its surface (surface of the dichroic filter), and then fixed into the apparatus and heated at a temperature of 250° C. by the use of a monochromatic quartz lamp. A phosphor layer having the thickness of approx. 100 μm was formed on the dichroic filter.

Thus, a radiation image storage panel consisting of a dichroic filter and a phosphor layer of deposited phosphor.

Comparison Example 2

The procedure of Example 2 was repeated except for using a transparent glass plate having the same thickness as that of the dichroic filter instead of the dichroic filter, to prepare a radiation image storage panel consisting of a support and a phosphor layer.

Comparison Example 3

A phosphor layer having the thickness of approx. 100 μm was formed on a transparent glass plate having the same thickness as that of the dichroic filter used in Example 2, in the same manner as described in Example 1.

Thus, a radiation image storage panel consisting of a support and a phosphor layer was prepared.

The radiation image storage panels prepared as above were evaluated on the sensitivity according to the above-mentioned test. The results are set forth in Table 2.

TABLE 2

| | Relative Sensitivity |
|---|---|
| Example 2 | 160 |
| Com. Example 2 | 100 |
| Com. Example 3 | 40 |

As is evident from the results set forth in Table 2, the radiation image storage panel having a multi-layer optical filter according to the invention (Example 2) was remarkably enhanced in the sensitivity, as compared with the radiation image storage panel having no multi-layer optical filter for comparison (Comparison Example 2).

Further, the radiation image storage panel having a phosphor layer of deposited phosphor and a multi-layer optical filter of the invention (Example 2) showed much higher sensitivity than the radiation image storage panel having a phosphor layer containing a binder and no multi-layer optical filter for comparison (Comparison Example 3).

We claim:

1. A radiation image storage panel comprising a phosphor layer containing a stimulable phosphor and a multi-layer optical filter which has a reflectance of not less than 60% at a stimulation wavelength of said stimulable phosphor when the stimulating ray is perpendicular to the surface of the phosphor and a transmittance of not less than 60% at a wavelength of a stimulated emission of the stimulable phosphor.

2. The radiation image storage panel as claimed in claim 1, in which said multi-layer optical filter has a reflectance of not less than 80% at the stimulation wavelength of the stimulable phosphor.

3. The radiation image storage panel as claimed in claim 1, in which said multi-layer optical filter has a transmittance of not less than 80% at the wavelength of the stimulated emission of the stimulable phosphor.

4. The radiation image storage panel as claimed in claim 1, in which said multi-layer optical filter is a dichroic filter.

5. The radiation image storage panel as claimed in claim 1, in which said multi-layer optical filter comprises at least one material of a low refractive index selected from the group consisting of $SiO_2$ and $MgF_2$ and at least one material of a high refractive index selected from the group consisting of $TiO_2$, $ZrO_2$ and ZnS.

6. The radiation image storage panel as claimed in claim 1, in which said multi-layer optical filter is formed by vacuum deposition.

7. The radiation image storage panel as claimed in claim 1, in which said phosphor layer comprises a binder and a stimulable phosphor dispersed therein.

8. The radiation image storage panel as claimed in claim 1, in which said phosphor layer consists essentially of a stimulable phosphor.

9. The radiation image storage pánel as claimed in claim 8, in which said phosphor layer consists essentially of a deposited stimulable phosphor.

10. The radiation image storage panel as claimed in claim 1, in which said phosphor layer consists essentially of a sintered stimulable phosphor.

11. The radiation image storage panel as claimed in claim 1, in which said panel consist essentially of a multi-layer optical filter, a phosphor layer and a protective film, superposed in this order.

12. The radiation image storage panel as claimed in claim 1, in which the stimulation wavelength of said stimulable phosphor is in the range of 400–900 nm.

13. The radiation image storage panel as claimed in claim 1, in which said stimulable phosphor is a divalent europium activated halide phosphor.

14. The radiation image storage panel as claimed in claim 1, in which said stimulable phosphor is a divalent europium activated fluoro-halide phosphor.

15. A radiation image storage panel consisting essentially of a multi-layer optical filter, a phosphor layer, and a protective film, superposed in the foregoing order where said phosphor layer contains a stimulable phosphor and said multi-layer optical filter has a reflectance of not less than 60% at a stimulation wavelength of said stimulable phosphor and a transmittance of not less than 60% at a wavelength of a stimulated emission of the stimulable phosphor.

* * * * *